(12) United States Patent
Zou et al.

(10) Patent No.: US 11,100,676 B2
(45) Date of Patent: Aug. 24, 2021

(54) DYEING COLOR MATCHING METHOD AND SYSTEM BASED ON PREFERENCE GENETIC ALGORITHM

(71) Applicant: XIANGTAN UNIVERSITY, Xiangtan (CN)

(72) Inventors: Juan Zou, Xiangtan (CN); Liuwei Fu, Xiangtan (CN); Changmin Hou, Xiangtan (CN); Mengyuan Yang, Xiangtan (CN); Qiuzhen Wang, Xiangtan (CN); Jinhua Zheng, Xiangtan (CN); Shengxiang Yang, Xiangtan (CN)

(73) Assignee: Xiangtan University, Xiangtan (CN)

( * ) Notice: Subject to any disclaimer, the term of this patent is extended or adjusted under 35 U.S.C. 154(b) by 165 days.

(21) Appl. No.: 16/562,552

(22) Filed: Sep. 6, 2019

(65) Prior Publication Data

US 2020/0118295 A1 Apr. 16, 2020

(30) Foreign Application Priority Data

Oct. 12, 2018 (CN) .......................... 201811187072.6

(51) Int. Cl.
*G06T 7/90* (2017.01)
*G01J 3/28* (2006.01)
(Continued)

(52) U.S. Cl.
CPC .............. *G06T 7/90* (2017.01); *G01J 3/2823* (2013.01); *G01J 3/463* (2013.01); *G06K 9/6215* (2013.01); *G06N 3/126* (2013.01)

(58) Field of Classification Search
CPC . G06T 7/90; G01J 3/2823; G01J 3/463; G01J 3/50; G01J 2003/466; G01J 2003/467; G06K 9/6215; G06N 3/126
See application file for complete search history.

(56) References Cited

U.S. PATENT DOCUMENTS 4,635,213 A * 1/1987 Murata .................... G01J 3/463
356/402
6,081,796 A * 6/2000 Takagi ...................... G01J 3/46
706/1
(Continued)

FOREIGN PATENT DOCUMENTS

CN 105787559 B * 12/2017

OTHER PUBLICATIONS

Google English Translation of CN105787559B Aquired on Apr. 26, 2021 (Year: 2016).*
(Continued)

*Primary Examiner* — Aaron W Carter
(74) *Attorney, Agent, or Firm* — Troutman Pepper Hamilton Sanders LLP; Christopher C. Close, Jr.

(57) ABSTRACT

A dyeing color matching method and system based on a preference genetic algorithm includes: obtaining a reflectivity of a color scheme sample and a first color scheme set having N color schemes; initializing the first color scheme set using a preference genetic algorithm to obtain an initialized color scheme set; conducting crossover and mutation on any two color schemes in the initialized set to obtain a second color scheme set having 2N color schemes; substituting the color schemes in the second set into the conventional model to obtain 2N model reflectivities; determining a third color scheme set according to the 2N model reflectivities; determining whether a color scheme that satisfies a customer's requirement exists in the third set; if yes, conducting proofing on the color scheme to obtain a proofing color scheme set; and determining a color scheme with a minimum color difference according to the proof color scheme.

10 Claims, 4 Drawing Sheets

(51) Int. Cl.
*G01J 3/46* (2006.01)
*G06K 9/62* (2006.01)
*G06N 3/12* (2006.01)

(56) References Cited

U.S. PATENT DOCUMENTS

| | | | | |
|---|---|---|---|---|
| 6,480,299 | B1* | 11/2002 | Drakopoulos | H04N 1/6033 358/1.1 |
| 8,175,382 | B2* | 5/2012 | Liu | H04N 1/628 382/167 |
| 8,456,697 | B2* | 6/2013 | Mestha | H04N 1/60 358/1.9 |
| 2005/0046883 | A1* | 3/2005 | Chiba | H04N 1/603 358/1.9 |
| 2005/0094171 | A1* | 5/2005 | Ogasahara | H04N 1/6033 358/1.9 |
| 2010/0053681 | A1* | 3/2010 | Sasaki | G06F 3/1205 358/1.15 |
| 2010/0290065 | A1* | 11/2010 | Shestak | H04N 1/6058 358/1.9 |
| 2011/0026053 | A1* | 2/2011 | Gil | H04N 1/54 358/1.9 |
| 2015/0268668 | A1* | 9/2015 | Nahmias | G05B 19/0428 700/282 |
| 2015/0379731 | A1* | 12/2015 | Dorner | G06Q 30/0276 382/164 |
| 2016/0321546 | A1* | 11/2016 | Delespierre | G06N 20/00 |
| 2020/0118295 | A1* | 4/2020 | Zou | G06T 7/90 |

OTHER PUBLICATIONS

Li et al. "A Dyeing Color Matching Method Combining RBF Neural Networks With Genetic Algorithms", IEEE (Year: 2007).*

* cited by examiner

DYEING COLOR MATCHING METHOD AND SYSTEM BASED ON PREFERENCE GENETIC ALGORITHM

This application claims priority to Chinese application number 201811187072.6, filed Oct. 12, 2018, with a title of DYEING COLOR MATCHING METHOD AND SYSTEM BASED ON PREFERENCE GENETIC ALGORITHM. The above-mentioned patent application is incorporated herein by reference in its entirety.

TECHNICAL FIELD

The present invention relates to the field of textile color matching, and in particular, to a dyeing color matching method and system based on a preference genetic algorithm.

BACKGROUND

At present, in wool textile enterprises, dyed monochromatic wool tops are widely mixed with a specific mass ratio to produce wool textile products of different colors. This production mode has the following advantages: (1) loose wool can be recycled in a production process, a use amount of dyed fibers is reduced, and environmental friendliness is also achieved; (2) plain products with a uniform color can be produced, and non-uniform special-effect products mixed with bloom can also be produced, so that a product effect can be ensured; (3) Due to color mixing for fiber dyeing, a series of problems such as competitive dyeing and staining caused by different fibers during blending and color mixture (different fibers of different colors) are avoided. However, a main color matching problem in dyeing and finishing still needs to be resolved. At present, enterprises mainly rely on experience and repeated test spinning and color matching, a production cycle is long, and efficiency is low. In a color matching method for colored spun yarns based on a neural network in an inventive patent No. CN105787559A, generalization of color matching can be increased, match colors are modified, but interactivity is not high. In order to adapt to market characteristics of "small batch, multiple varieties, and fast delivery", a conventional model (Stearns-Noechel model) and a preference genetic algorithm are combined to obtain a color scheme.

SUMMARY

An object of the present invention is to provide a dyeing color matching method and system based on a preference genetic algorithm, to resolve a problem of insufficiency in color matching.

To achieve the above purpose, the present invention provides the following technical solutions.

A dyeing color matching method based on a preference genetic algorithm includes:

obtaining a reflectivity of a color scheme sample;

substituting the reflectivity into a conventional model to obtain a sample model reflectivity;

obtaining a first color scheme set, where there are N color schemes in the first color scheme set;

initializing the first color scheme set by using a preference genetic algorithm to obtain an initialized color scheme set;

conducting crossover and mutation on any two color schemes in the initialized color scheme set to obtain a second color scheme, where there are 2N color schemes in the second color scheme set;

substituting the color schemes in the second color scheme set into the conventional model to obtain 2N model reflectivities;

determining 2N crowding distances according to the sample model reflectivity and the model reflectivities;

determining a third color scheme set according to the 2N crowding distances;

determining whether a color scheme that satisfies a customer's requirement exists in the third color scheme set;

if yes, outputting the third color scheme set; or if no, returning to the step of conducting crossover and mutation on any two color schemes in the initialized color scheme set to obtain a second color scheme;

selecting a color scheme that is in the third color scheme set and that best satisfies a customer's requirement, conducting proofing on the color scheme to obtain a proofing color scheme set;

obtaining reflectivities of all proofing color schemes in the proofing color scheme set; and calculating a color difference between each of the reflectivities of the proofing color schemes and the sample model reflectivity to obtain a color scheme with a minimum color difference, where the color scheme with a minimum color difference is a best monochrome composition scheme.

Optionally, the determining a third color scheme set according to the 2N crowding distances specifically includes:

sorting the 2N crowding distances in ascending order, and selecting the first N color schemes as the third color scheme set.

Optionally, the calculating a color difference between each of the reflectivities of the proofing color schemes and the sample model reflectivity to obtain a color scheme with a minimum color difference specifically includes:

calculating the color difference between each of the reflectivities of the proofing color schemes and the sample model reflectivity by using a color difference formula to obtain the color scheme with a minimum color difference.

Optionally, the substituting the reflectivity into a conventional model to obtain a sample model reflectivity specifically includes:

obtaining a wavelength used when a spectrophotometer measures a color scheme; and substituting the reflectivity and the wavelength into a formula $$f[R(\lambda)] = \frac{1 - R(\lambda)}{M[R(\lambda) - 0.01] + 0.01}$$

to obtain the sample model reflectivity, where

M represents a variable constant and is determined according to an experiment, and $R(\lambda)$ represents a reflectivity when a wavelength is $\lambda$.

Optionally, the determining 2N crowding distances according to the sample model reflectivity and the model reflectivities specifically includes:

determining the crowding distances according to a formula $D=f(Rs)-f(Rp)$, where $f(Rs)$ represents the sample model reflectivity, $f(Rp)$ represents each model reflectivity, and D represents a crowding distance.

A dyeing color matching system based on a preference genetic algorithm includes:

a first obtaining module, configured to obtain a reflectivity of a color scheme sample;

a sample model reflectivity determining module, configured to substitute the reflectivity into a conventional model to obtain a sample model reflectivity;

a second obtaining module, configured to obtain a first color scheme set, where there are N color schemes in the first color scheme set;

an initialization module, configured to initialize the first color scheme set by using a preference genetic algorithm, to obtain an initialized color scheme set;

a crossover and mutation module, configured to conduct crossover and mutation on any two color schemes in the initialized color scheme set to obtain a second color scheme, where there are 2N color schemes in the second color scheme set;

a model reflectivity determining module, configured to substitute the color schemes in the second color scheme set into the conventional model to obtain 2N model reflectivities;

a crowding distance determining module, configured to determine 2N crowding distances according to the sample model reflectivity and the model reflectivities;

a third-color-scheme-set determining module, configured to determine a third color scheme set according to the 2N crowding distances;

a determining module, configured to determine whether a color scheme that satisfies a customer's requirement exists in the third color scheme set;

an output module, configured to: if a color scheme that satisfies the customer's requirement exists in the third color scheme set, output the third color scheme set; or if no color scheme that satisfies the customer's requirement exists in the third color scheme set, return to the step of conducting crossover and mutation on any two color schemes in the initialized color scheme set to obtain a second color scheme;

a proofing color scheme set determining module, configured to select a color scheme that is in the third color scheme set and that best satisfies a customer's requirement, conduct proofing on the color scheme to obtain a proofing color scheme set;

a third obtaining module, configured to obtain reflectivities of all proofing color schemes in the proofing color scheme set; and a best-monochrome-composition-scheme determining module, configured to calculate a color difference between each of the reflectivities of the proofing color schemes and the sample model reflectivity to obtain a color scheme with a minimum color difference, where the color scheme with a minimum color difference is a best monochrome composition scheme.

Optionally, the third-color-scheme-set determining module specifically includes:

a third-color-scheme-set determining unit, configured to sort the 2N crowding distances in ascending order, and select the first N color schemes as the third color scheme set.

Optionally, the best-monochrome-composition-scheme determining module specifically includes:

a best-monochrome-composition-scheme determining unit, configured to calculate the color difference between each of the reflectivities of the proofing color schemes and the sample model reflectivity by using a color difference formula to obtain the color scheme with a minimum color difference.

Optionally, the sample model reflectivity determining module specifically includes:

an obtaining unit, configured to obtain a wavelength used when a spectrophotometer measures a color scheme; and a sample model reflectivity determining unit, configured to substitute the reflectivity and the wavelength into a formula $$f[R(\lambda)] = \frac{1 - R(\lambda)}{M[R(\lambda) - 0.01] + 0.01}$$

to obtain the sample model reflectivity, where

M represents a variable constant and is determined according to an experiment, and $R(\lambda)$ represents a reflectivity when a wavelength is $\lambda$.

Optionally, the crowding distance determining module specifically includes:

a crowding distance determining unit, configured to determine the crowding distances according to a formula D=f(Rs)−f(Rp), where f(Rs) represents the sample model reflectivity, f(RP) represents each model reflectivity, and D represents a crowding distance.

According to specific embodiments of the present invention, the present invention discloses the following technical effect: The present invention provides a dyeing color matching method based on a preference genetic algorithm; based on a conventional model, a preference genetic algorithm is used to form a color scheme, so as to resolve a problem of insufficiency in a color matching procedure (a color matching solution), and the dyeing color matching method has interactivity and can be adapt to characteristics of small batch, multiple varieties (distributivity), and fast delivery.

BRIEF DESCRIPTION OF THE DRAWINGS

To describe the technical solutions in the embodiments of the present invention or in the prior art more clearly, the following briefly describes the accompanying drawings required for describing the embodiments. Apparently, the accompanying drawings in the following description show some embodiments of the present invention, and a person of ordinary skill in the art may still derive other drawings from these accompanying drawings without creative efforts.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

An object of the present invention is to provide a dyeing color matching method and system based on a preference genetic algorithm, to resolve a problem of insufficiency in color matching.

To make the objectives, features, and advantages of the present invention more obvious and easy to understand, the following further describes the present invention in details with reference to the accompanying drawings and specific implementations.

Figure 1:
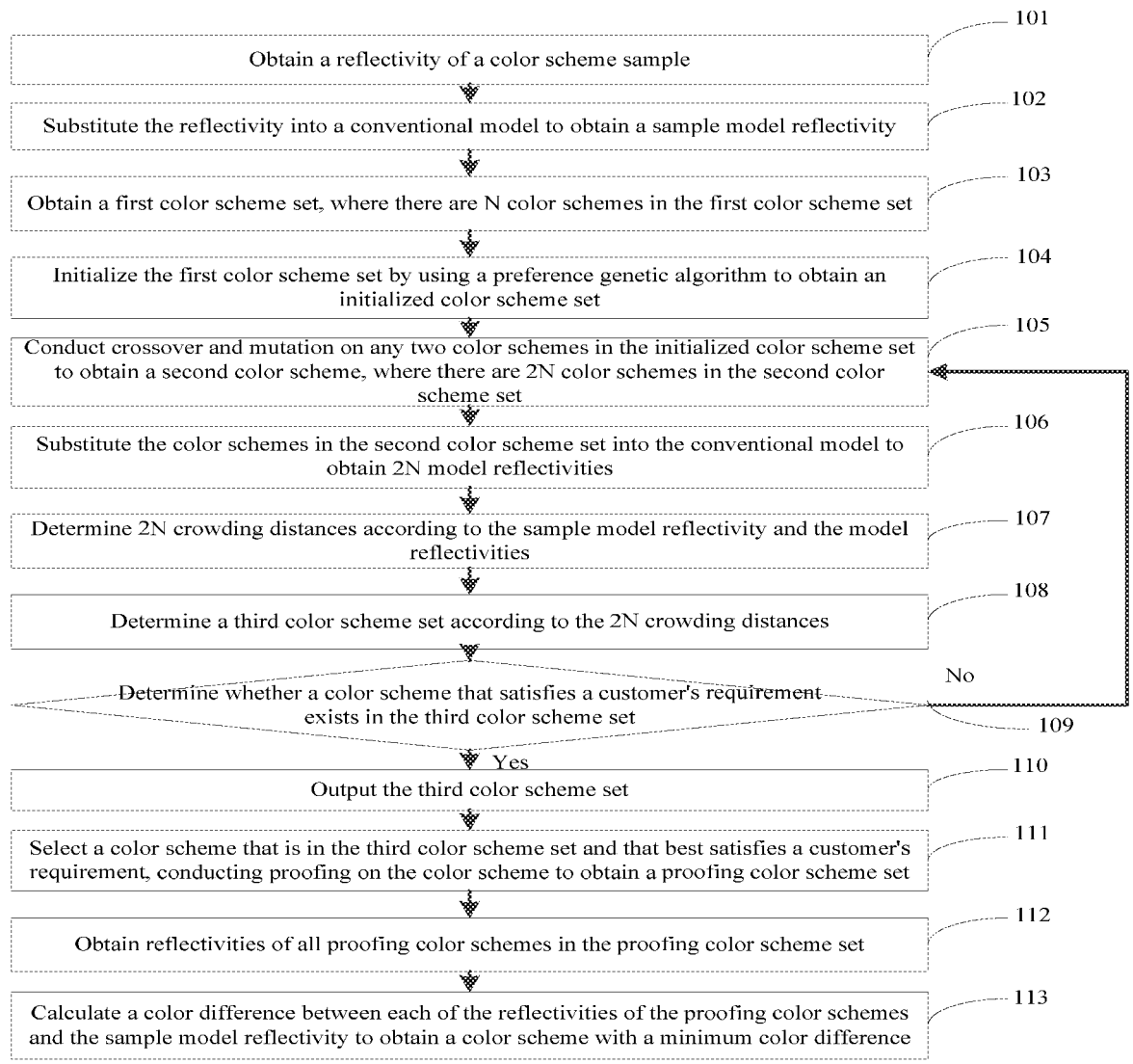
FIG. 1 is a flowchart of a dyeing color matching method based on a preference genetic algorithm according to an embodiment of the present invention.

FIG. 1 is a flowchart of a dyeing color matching method based on a preference genetic algorithm according to an embodiment of the present invention. As shown in FIG. 1, the dyeing color matching method based on a preference genetic algorithm is provided. The method includes the following steps:

Step 101: Obtain a reflectivity of a color scheme sample.

Step 102: Substitute the reflectivity into a conventional model to obtain a sample model reflectivity.

Step 103: Obtain a first color scheme set, where there are N color schemes in the first color scheme set.

Step 104: Initialize the first color scheme set by using a preference genetic algorithm to obtain an initialized color scheme set.

Step 105: Conduct crossover and mutation on any two color schemes in the initialized color scheme set to obtain a second color scheme, where there are 2N color schemes in the second color scheme set.

Step 106: Substitute the color schemes in the second color scheme set into the conventional model to obtain 2N model reflectivities.

Step 107: Determine 2N crowding distances according to the sample model reflectivity and the model reflectivities.

Step 108: Determine a third color scheme set according to the 2N crowding distances.

Step 109: Determine whether a color scheme that satisfies a customer's requirement exists in the third color scheme set.

Step 110: If yes, output the third color scheme set.

If no, return to the step of conducting crossover and mutation on any two color schemes in the initialized color scheme set to obtain a second color scheme.

Step 111: Select a color scheme that is in the third color scheme set and that best satisfies the customer's requirement, conducting proofing on the color scheme to obtain a proofing color scheme set.

Step 112: Obtain reflectivities of all proofing color schemes in the proofing color scheme set.

Step 113: Calculate a color difference between each of the reflectivities of the proofing color schemes and the sample model reflectivity to obtain a color scheme with a minimum color difference, where the color scheme with a minimum color difference is a best monochrome composition scheme.

Step 108 specifically includes:

sorting the 2N crowding distances in ascending order, and selecting the first N color schemes as the third color scheme set.

Step 113 specifically includes:

calculating the color difference between each of the reflectivities of the proofing color schemes and the sample model reflectivity by using a color difference formula to obtain the color scheme with a minimum color difference.

Step 102 specifically includes:

obtaining a wavelength used when a spectrophotometer measures a color scheme;

substituting the reflectivity and the wavelength into a formula $$f[R(\lambda)] = \frac{1 - R(\lambda)}{M[R(\lambda) - 0.01] + 0.01}$$

to obtain the sample model reflectivity, where

M represents a variable constant and is determined according to an experiment, and $R(\lambda)$ represents a reflectivity when a wavelength is $\lambda$.

Step 107 specifically includes:

determining the crowding distances according to a formula D=f(Rs)−f(Rp), where f(Rs) represents the sample model reflectivity, represents each model reflectivity, and D represents a crowding distance.

The spectrophotometer is used to test a reflectivity Rs of a standard sample. A measurement wavelength range of the spectrophotometer is 400 nm to 700 nm, and an interval thereof is 10 nm. A Stearns-Noechel model formula is used herein to measure a model reflectivity of each monochrome and a color scheme, and its expression is as follows:

$$f[R(\lambda)] = \frac{1 - R(\lambda)}{M[R(\lambda) - 0.01] + 0.01}$$

In the expression, M represents a variable constant and is determined according to an experiment, and $R(\lambda)$ represents a reflectivity when a wavelength is $\lambda$. A proportion formula of a color scheme and different monochromatic fibers is as follows:

$$F[R]_\lambda = \sum_{i=1}^{n} x_i F[R_i]_\lambda$$

$F[R]_\lambda$ represents a reflectivity of an output the color scheme; $F[R_i]_\lambda$ represents a reflectivity of a monochrome $R_i$ when a wavelength is $\lambda$; and $x_i$ represents a quantity or a ratio of the monochrome $R_i$.

A genetic algorithm is used to solve the Stearns-Noechel model formula, and individuals are initialized to form an initial population whose size is N. An individual means a binary code including reflectivities of all monochromes at the wavelength $\lambda$, and the code represents a color scheme. The preference genetic algorithm is used for implementation.

Two individuals are randomly selected from the initial population for crossover and mutation to generate two new individuals. The process is repeated to generate a new population with a same number as the initial population, and the new population is added to the initial population to form a double population.

Each individual in the double population is a color scheme, and is denoted as Rp. The newly generated individual has not undergone elitist selection, and has a relatively large difference with a target color. Therefore, to select an excellent individual (color scheme), a function value difference between each individual in the double population and a target needs to be calculated. Herein, a function difference value in a model formula is denoted as a crowding distance. Each individual has a crowding distance (a function difference value), and there are 2N individuals in total.

A smaller crowding distance value indicates that: an individual (a color scheme) is closer to a standard color, a matching degree is higher, and color matching is better. Distributivity (color matching diversity) and extreme values (there is a minimum difference between a color scheme and the standard color) are sorted, the first N individuals have best distributivity and extreme values. Therefore, the first N individuals are selected as a new population, and this population is a father population for next-generation crossover and mutation.

In the new population, an individual is a best color scheme, it can be determined from the individual whether color matching meets an output requirement. More importantly, a user can make further adjustment according to a scheme, and if the user prefers a solution set, an algorithm is used to generate a large number of individuals in the user preference area for selecting an optimum value.

Individuals (color schemes) in the population have a color scheme that can best meet a user requirement. According to the scheme, proofing is conducted and a reflectivity Rp after proofing is retested.

A color difference between Rp of a color proof and reflectivity of a standard sample is calculated by using a color difference formula CMC 2:1 or CIE1976*a*b*, and a color scheme with a minimum color difference is output, which is a best monochrome composition scheme.

Based on a conventional model, in the present invention, a preference genetic algorithm is used to form a color scheme, so as to resolve a problem of insufficiency in a color matching procedure (a color matching solution), and the present invention has interactivity and can be adapted to characteristics of small batch, multiple varieties (distributivity), and fast delivery.

Figures 2, 3:
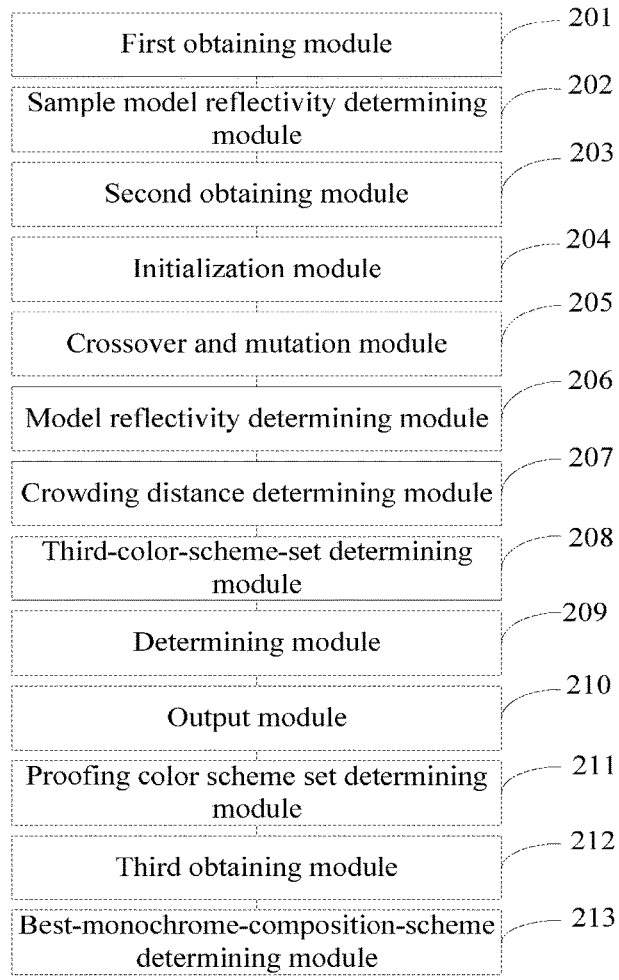
FIG. 2 is a structural diagram of a dyeing color matching system based on a preference genetic algorithm according to an embodiment of the present invention.
FIG. 3 is a schematic diagram of a color scheme set according to Embodiment 1 of the present invention.

FIG. 2 is a structural diagram of a dyeing color matching system based on a preference genetic algorithm according to an embodiment of the present invention. As shown in FIG. 2, the dyeing color matching system based on a preference genetic algorithm is provided. The system includes:

a first obtaining module 201, configured to obtain a reflectivity of a color scheme sample;

a sample model reflectivity determining module 202, configured to substitute the reflectivity into a conventional model to obtain a sample model reflectivity;

a second obtaining module 203, configured to obtain a first color scheme set, where there are N color schemes in the first color scheme set;

an initialization module 204, configured to initialize the first color scheme set by using a preference genetic algorithm, to obtain an initialized color scheme set;

a crossover and mutation module 205, configured to conduct crossover and mutation on any two color schemes in the initialized color scheme set to obtain a second color scheme, where there are 2N color schemes in the second color scheme set;

a model reflectivity determining module 206, configured to substitute the color schemes in the second color scheme set into the conventional model to obtain 2N model reflectivities;

a crowding distance determining module 207, configured to determine 2N crowding distances according to the sample model reflectivity and the model reflectivities;

a third-color-scheme-set determining module 208, configured to determine a third color scheme set according to the 2N crowding distances;

a determining module 209, configured to determine whether a color scheme that satisfies a customer's requirement exists in the third color scheme set;

an output module 210, configured to: if a color scheme that satisfies the customers requirement exists in the third color scheme set, output the third color scheme set; or if no color scheme that satisfies the customers requirement exists in the third color scheme set, return to the step of conducting crossover and mutation on any two color schemes in the initialized color scheme set to obtain a second color scheme;

a proofing color scheme set determining module 211, configured to select a color scheme that is in the third color scheme set and that best satisfies the customers requirement, conduct proofing on the color scheme to obtain a proofing color scheme set;

a third obtaining module 212, configured to obtain reflectivities of all proofing color schemes in the proofing color scheme set; and a best-monochrome-composition-scheme determining module 213, configured to calculate a color difference between each of the reflectivities of the proofing color schemes and the sample model reflectivity to obtain a color scheme with a minimum color difference, where the color scheme with a minimum color difference is a best monochrome composition scheme.

The third-color-scheme-set determining module 208 specifically includes:

a third-color-scheme-set determining unit, configured to sort the 2N crowding distances in ascending order, and select the first N color schemes as the third color scheme set.

The best-monochrome-composition-scheme determining module 213 specifically includes:

a best-monochrome-composition-scheme determining unit, configured to calculate the color difference between each of the reflectivities of the proofing color schemes and the sample model reflectivity by using a color difference formula to obtain the color scheme with a minimum color difference.

The sample model reflectivity determining module 202 specifically includes:

an obtaining unit, configured to obtain a wavelength used when a spectrophotometer measures a color scheme; and a sample model reflectivity determining unit, configured to substitute the reflectivity and the wavelength into a formula $$f[R(\lambda)] = \frac{1 - R(\lambda)}{M[R(\lambda) - 0.01] + 0.01}$$

to obtain the sample model reflectivity, where

M represents a variable constant and is determined according to an experiment, and $R(\lambda)$ represents a reflectivity when a wavelength is $\lambda$.

The crowding distance determining module 207 specifically includes:

a crowding distance determining unit, configured to determine the crowding distances according to a formula D=f(Rs)−f(Rp), where f(Rs) represents the sample model reflectivity, f(RP) represents each model reflectivity, and D represents a crowding distance.

Specific Embodiment 1

In this embodiment, six monochromes: R, B, W, Y, G, and D (red, blue, white, yellow, green, and black) are used as basic monochromes, different color schemes are formed through monochrome proportioning, and a formula Y60B35D5 means that the formula includes yellow 60%, blue 35%, and black 5%. A reflectivity $R_i$ of each monochromic fiber fabric piece and a reflectivity Rs of a standard color are tested by a spectrometer. A measurement wavelength of the instrument is 400 nm to 700 nm, and an interval thereof is 10 nm. $R_i$ and Rs are substituted into a Stearns-Noechel model formula (1) to obtain F(Ri) and F(Rs).

A genetic algorithm is used to initialize individuals, and each individual represents a color scheme. FIG. 3 is a schematic diagram of a color scheme set according to Embodiment 1 of the present invention.

Figure 4:
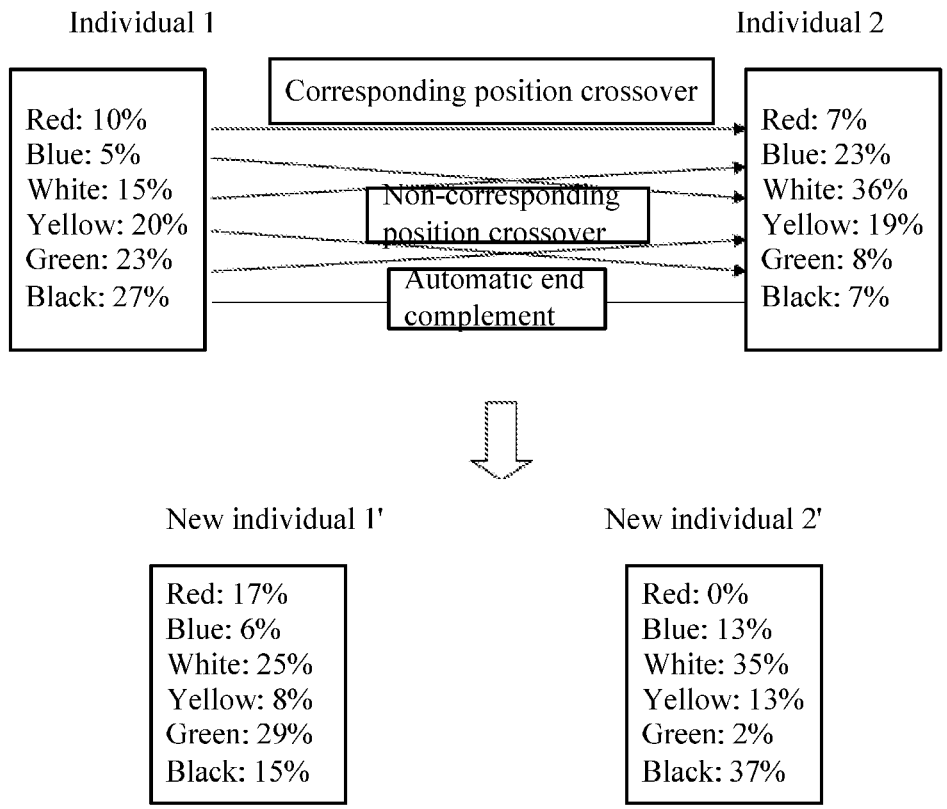
FIG. 4 is a schematic crossover diagram according to Embodiment 1 of the present invention.

FIG. 4 is a schematic crossover diagram according to Embodiment 1 of the present invention. If 100 individuals during initialization are greatly different from a standard color and do not meet a color proportion condition, crossover and mutation operations are conducted to generate a new individual. If an individual 1 and an individual 2 are selected as parent individuals, a crossover result is shown in FIG. 4.

Figure 5:
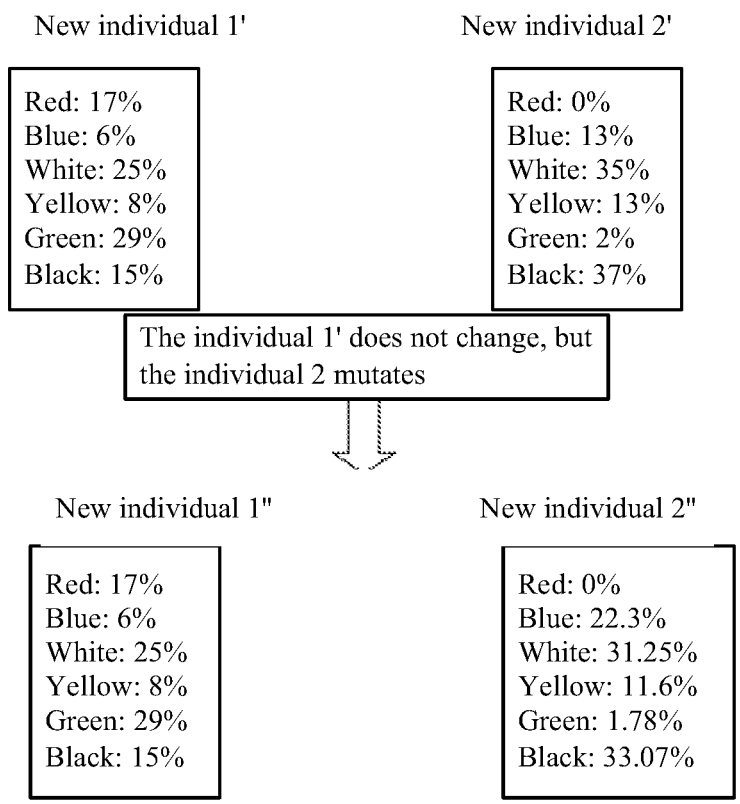
FIG. 5 is a schematic mutation diagram according to Embodiment 1 of the present invention.

FIG. 5 is a schematic mutation diagram according to Embodiment 1 of the present invention. Relatively, mutation means that a value in an individual is randomly changed and the value of the individual is changed. For example, if mutation occurs in a new individual 2', a mutation position is a blue location, and a value changes from 13% to 22.3%, proportions corresponding to all positions are recalculated, and a mutation result is shown in FIG. 5.

In a new individual, no mutation occurs in an individual 1', and mutation occurs only in the individual 2'. During crossover and mutation, crossover is to produce a new solution (a new color scheme), and obviously, two excellent individuals account for very large proportions, two excellent new individuals are produced. Then, if only simple crossover is conducted, a local solution is inevitably produced. In this case, mutation plays a role, and mutation causes individuals to be removed from a local area one by one to search for a global optimal solution. In a process of searching for a solution set, mutation always exists with a specific probability, and satisfies a natural selection condition. In an experiment, a mutation probability is set to 0.5. When an individual meets a mutation condition (a probability), a mutation position is generated, and data in this position is randomly assigned again. Therefore, a ratio of all monochromes needs to be recalculated. After mutation, new individuals generated are a new individual 1" and a new individual 2". In this case, the new individuals have a high probability of being better than a parent individual. Certainly, the new individual may be inferior to a parent individual, but in an elite selection process, a non-elite individual is discarded. Then, the new individual is substituted into Formula (2). A result obtained according to Formula (2) is compared with F(Rs) of a standard color, an individual with a smaller difference is better, and the individual becomes an elite individual. The elite individuals is retained and become a father generation of a next generation. After repeated iterations, a best individual is generated, and the best individual (color scheme) is output. It should be noted that, during crossover and mutation, both crossover and mutation positions are generated randomly, a crossover probability is 100%, and a mutation probability is 5%.

$$f[R(\lambda)] = \frac{1 - R(\lambda)}{M[R(\lambda) - 0.01] + 0.01} \quad (1)$$

$$F[R]_\lambda = \sum_{i=1}^{n} x_i F[R_i]_\lambda \quad (2)$$

Embodiment 2

A color scheme based on a preference genetic algorithm provided in this embodiment mainly includes the following steps: (1) measuring a reflectivity of a standard sample (Y60B35D5), and substituting the reflectivity into a Stearns-Noechel model formula, where the reflectivity is denoted as Rs, and F(Rs) represents a model reflectivity; (2) generating an initial population by using the preference genetic algorithm, conducting iteration selection, and selecting an elite individual by comparing F(Rs) with a value obtained by substituting $F(R_i)$ of each individual (color scheme) into a color proportioning formula; and (3) in a final iteration, outputting a formula (Y59.89B34.88D5.23), conducting proofing, and testing a sample reflectivity. A color difference calculated by using a CMC color difference formula is 0.19, which meets a color difference requirement, and then a color scheme is completed.

Embodiment 3

A color scheme based on a preference genetic algorithm provided in this embodiment mainly includes the following steps: (1) measuring a reflectivity of a standard sample (R42B58), and substituting the reflectivity into a Stearns-Noechel model formula, where the reflectivity is denoted as Rs, and F(Rs) represents a model reflectivity; (2) generating an initial population by using the preference genetic algorithm, conducting iteration selection, and selecting an elite individual by comparing F(Rs) with a value obtained by substituting $F(R_i)$ of each individual (color scheme) into a color proportioning formula; and (3) in a final iteration, outputting a formula (R41.24B58.76), conducting proofing, and testing a sample reflectivity. A color difference calculated by using a CMC color difference formula is 0.34, which meets a color difference requirement, and then a color scheme is completed.

Embodiment 4

A color scheme based on a preference genetic algorithm provided in this embodiment mainly includes the following steps: (1) measuring a reflectivity of a standard sample (W37D63), and substituting the reflectivity into a Stearns-Noechel model formula, where the reflectivity is denoted as Rs, and F(Rs) represents a model reflectivity; (2) generating an initial population by using the preference genetic algorithm, conducting iteration selection, and selecting an elite individual by comparing F(Rs) with a value obtained by substituting $F(R_i)$ of each individual (color scheme) into a color proportioning formula; and (3) in a final iteration, outputting a formula (W38.60D59.7Y0.17), conducting proofing, and testing a sample reflectivity. A color difference calculated by using a CMC color difference formula is excessively large and does not meet a requirement that a CMC color difference is less than 1. Therefore, a formula correction selection program is used. According to the color difference, the last generation of individual solution set (color scheme set) is corrected, and individuals (W36.60D62.7Y0.07) satisfying the condition are output.

Proofing is conducted again, a color difference is calculated and is 0.27, which satisfies the color difference requirement, and therefore the color scheme is completed.

Each embodiment of the present specification is described in a progressive manner, each embodiment focuses on the difference from other embodiments, and the same and similar parts between the embodiments may refer to each other. For a system disclosed in the embodiments, since it corresponds to the method disclosed in the embodiments, the description is relatively simple, and reference can be made to the method description.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the invention.

What is claimed is:

1. A dyeing color matching method based on a preference genetic algorithm, wherein the method comprises:
    obtaining a reflectivity of a color scheme sample;
    substituting the reflectivity into a conventional model to obtain a sample model reflectivity;
    obtaining a first color scheme set, wherein there are N color schemes in the first color scheme set;
    initializing the first color scheme set by using a preference genetic algorithm to obtain an initialized color scheme set;
    conducting crossover and mutation on any two color schemes in the initialized color scheme set to obtain a second color scheme, wherein there are 2N color schemes in the second color scheme set;
    substituting the color schemes in the second color scheme set into the conventional model to obtain 2N model reflectivities;
    determining 2N crowding distances according to the sample model reflectivity and the model reflectivities;
    determining a third color scheme set according to the 2N crowding distances;
    determining whether a color scheme that satisfies a customer's requirement exists in the third color scheme set;
    if yes, outputting the third color scheme set; or
    if no, returning to the step of conducting crossover and mutation on any two color schemes in the initialized color scheme set to obtain a second color scheme;
    selecting a color scheme that is in the third color scheme set and that best satisfies a customer's requirement, conducting proofing on the color scheme to obtain a proofing color scheme set;
    obtaining reflectivities of all proofing color schemes in the proofing color scheme set; and
    calculating a color difference between each of the reflectivities of the proofing color schemes and the sample model reflectivity to obtain a color scheme with a minimum color difference, wherein the color scheme with a minimum color difference is a best monochrome composition scheme.

2. The dyeing color matching method based on a preference genetic algorithm according to claim 1, wherein the determining a third color scheme set according to the 2N crowding distances specifically comprises:
    sorting the 2N crowding distances in ascending order, and selecting the first N color schemes as the third color scheme set.

3. The dyeing color matching method based on a preference genetic algorithm according to claim 1, wherein the calculating a color difference between each of the reflectivities of the proofing color schemes and the sample model reflectivity to obtain a color scheme with a minimum color difference specifically comprises:
    calculating the color difference between each of the reflectivities of the proofing color schemes and the sample model reflectivity by using a color difference formula to obtain the color scheme with a minimum color difference.

4. The dyeing color matching method based on a preference genetic algorithm according to claim 1, wherein the substituting the reflectivity into a conventional model to obtain a sample model reflectivity specifically comprises:
    obtaining a wavelength used when a spectrophotometer measures a color scheme; and
    substituting the reflectivity and the wavelength into a formula $$f[R(\lambda)] = \frac{1 - R(\lambda)}{M[R(\lambda) - 0.01] + 0.01}$$

to obtain the sample model reflectivity, wherein
    M represents a variable constant and is determined according to an experiment, and $R(\lambda)$ represents a reflectivity when a wavelength is $\lambda$.

5. The dyeing color matching method based on a preference genetic algorithm according to claim 1, wherein the determining 2N crowding distances according to the sample model reflectivity and the model reflectivities specifically comprises:
    determining the crowding distances according to a formula $D=f(Rs)-f(Rp)$, wherein
    $f(Rs)$ represents the sample model reflectivity, $f(Rp)$ represents each model reflectivity, and D represents a crowding distance.

6. A dyeing color matching system based on a preference genetic algorithm, wherein the system comprises:
    a first obtaining module, configured to obtain a reflectivity of a color scheme sample;
    a sample model reflectivity determining module, configured to substitute the reflectivity into a conventional model to obtain a sample model reflectivity;
    a second obtaining module, configured to obtain a first color scheme set, wherein there are N color schemes in the first color scheme set;
    an initialization module, configured to initialize the first color scheme set by using a preference genetic algorithm, to obtain an initialized color scheme set;
    a crossover and mutation module, configured to conduct crossover and mutation on any two color schemes in the initialized color scheme set to obtain a second color scheme, wherein there are 2N color schemes in the second color scheme set;
    a model reflectivity determining module, configured to substitute the color schemes in the second color scheme set into the conventional model to obtain 2N model reflectivities;
    a crowding distance determining module, configured to determine 2N crowding distances according to the sample model reflectivity and the model reflectivities;

a third-color-scheme-set determining module, configured to determine a third color scheme set according to the 2N crowding distances;

a determining module, configured to determine whether a color scheme that satisfies a customers requirement exists in the third color scheme set;

an output module, configured to: if a color scheme that satisfies the customers requirement exists in the third color scheme set, output the third color scheme set; or if no color scheme that satisfies the customers requirement exists in the third color scheme set, return to the step of conducting crossover and mutation on any two color schemes in the initialized color scheme set to obtain a second color scheme;

a proofing color scheme set determining module, configured to select a color scheme that is in the third color scheme set and that best satisfies a customers requirement, conduct proofing on the color scheme to obtain a proofing color scheme set;

a third obtaining module, configured to obtain reflectivities of all proofing color schemes in the proofing color scheme set; and a best-monochrome-composition-scheme determining module, configured to calculate a color difference between each of the reflectivities of the proofing color schemes and the sample model reflectivity to obtain a color scheme with a minimum color difference, wherein the color scheme with a minimum color difference is a best monochrome composition scheme.

7. The dyeing color matching system based on a preference genetic algorithm according to claim 6, wherein the third-color-scheme-set determining module specifically comprises:

a third-color-scheme-set determining unit, configured to sort the 2N crowding distances in ascending order, and select the first N color schemes as the third color scheme set.

8. The dyeing color matching system based on a preference genetic algorithm according to claim 6, wherein the best-monochrome-composition-scheme determining module specifically comprises:

a best-monochrome-composition-scheme determining unit, configured to calculate the color difference between each of the reflectivities of the proofing color schemes and the sample model reflectivity by using a color difference formula to obtain the color scheme with a minimum color difference.

9. The dyeing color matching system based on a preference genetic algorithm according to claim 6, wherein the sample model reflectivity determining module specifically comprises:

an obtaining unit, configured to obtain a wavelength used when a spectrophotometer measures a color scheme; and a sample model reflectivity determining unit, configured to substitute the reflectivity and the wavelength into a formula $$f[R(\lambda)] = \frac{1 - R(\lambda)}{M[R(\lambda) - 0.01] + 0.01}$$

to obtain the sample model reflectivity, wherein

M represents a variable constant and is determined according to an experiment, and $R(\lambda)$ represents a reflectivity when a wavelength is $\lambda$.

10. The dyeing color matching system based on a preference genetic algorithm according to claim 6, wherein the crowding distance determining module specifically comprises:

a crowding distance determining unit, configured to determine the crowding distances according to a formula D=f(Rs)−f(Rp), wherein f(Rs) represents the sample model reflectivity, f(Rp) represents each model reflectivity, and D represents a crowding distance.

* * * * *